United States Patent [19]

Retzlaff

[11] Patent Number: 5,425,522
[45] Date of Patent: Jun. 20, 1995

[54] VEHICLE SEAT ADJUSTER WITH CONVENIENTLY ACCESSIBLE ROTARY ACTUATOR

[75] Inventor: Scott Retzlaff, Roscoe, Ill.

[73] Assignee: Atwood Industries, Inc., Rockford, Ill.

[21] Appl. No.: 227,000

[22] Filed: Apr. 13, 1994

[51] Int. Cl.⁶ ............................................. F16M 13/00
[52] U.S. Cl. .................... 248/429; 248/419; 248/430
[58] Field of Search ................ 248/429, 419, 430; 297/344.1; 292/11, 48, 56

[56] References Cited

U.S. PATENT DOCUMENTS

| | | | |
|---|---|---|---|
| 2,219,456 | 10/1940 | Saunders et al. | 155/14 |
| 2,252,218 | 8/1941 | Thoma | 155/14 |
| 2,713,384 | 7/1955 | Rosenberg | 248/430 |
| 2,827,106 | 3/1958 | Cramer et al. | 248/430 |
| 3,912,215 | 10/1975 | Reinmoller et al. | 248/421 |
| 4,580,755 | 4/1986 | Rees | 248/430 |
| 5,076,529 | 12/1991 | Dove et al. | 248/429 |
| 5,358,207 | 10/1994 | West | 248/430 |

FOREIGN PATENT DOCUMENTS

| | | | |
|---|---|---|---|
| 244137 | 3/1963 | Australia | 248/430 |
| 730944 | 3/1966 | Canada . | |

*Primary Examiner*—Alvin C. Chin-Shue
*Assistant Examiner*—Catherine S. Collins
*Attorney, Agent, or Firm*—Leydig, Voit & Mayer, Ltd.

[57] ABSTRACT

A vehicle seat adjuster includes laterally spaced track assemblies each having an upper track slidable fore-and-aft relative to a lower track and normally locked to the lower track by a latch adapted to be pivoted about an upright axis to an unlatched position. Pivoting of the latches is effected by manually turning an operating handle about a laterally extending axis, the handle being conveniently located adjacent and accessible from the outboard side of the vehicle seat.

4 Claims, 2 Drawing Sheets

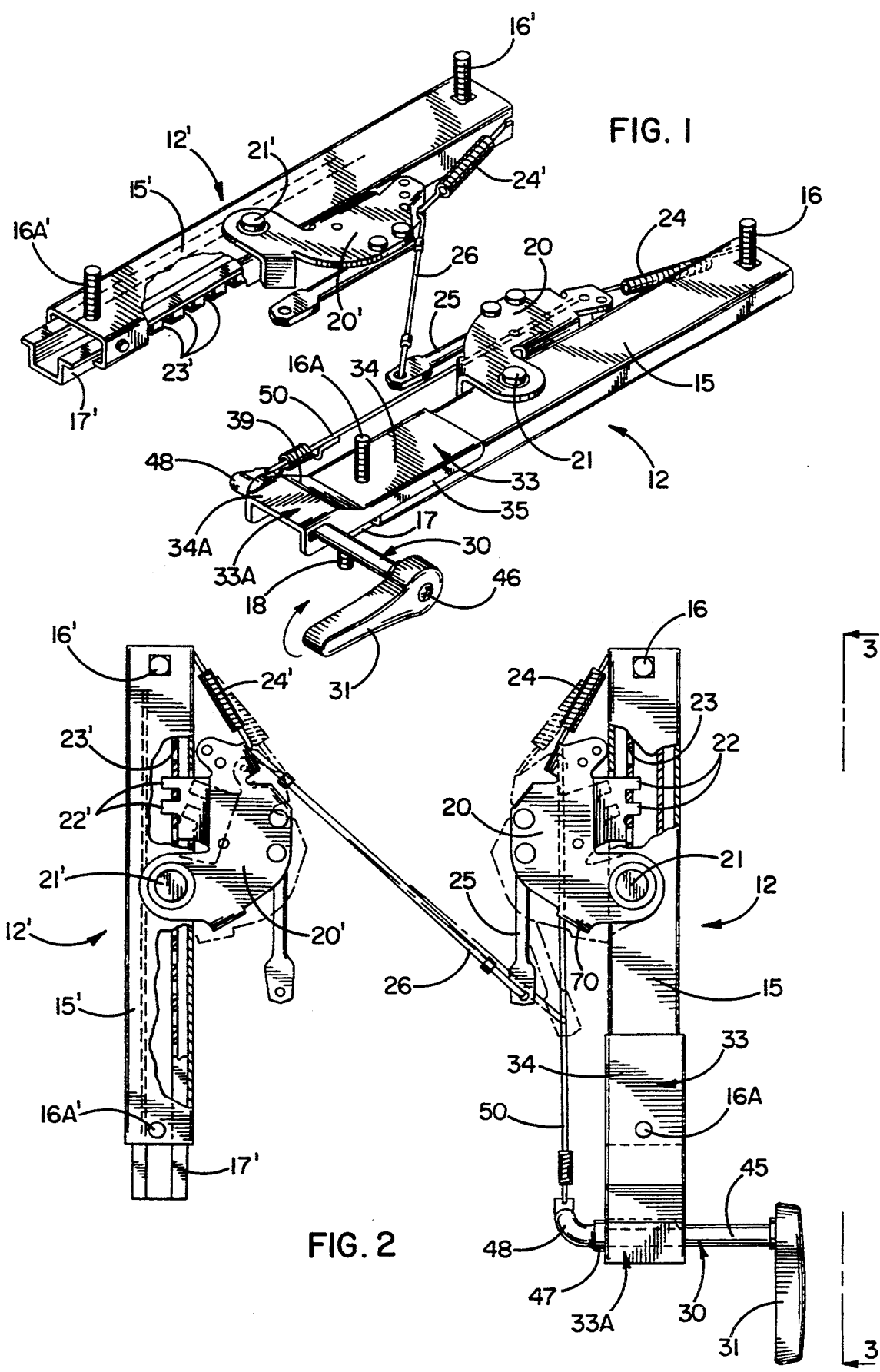

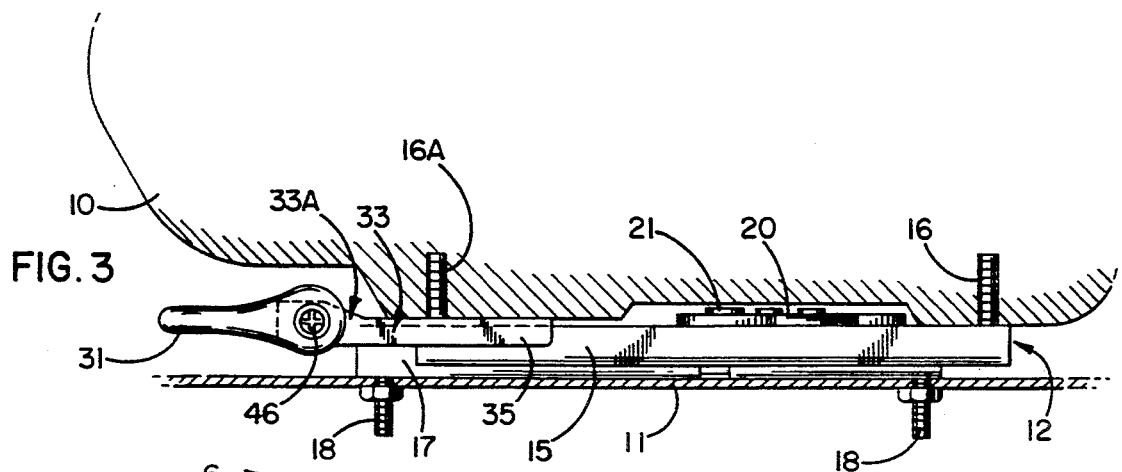
FIG. 3
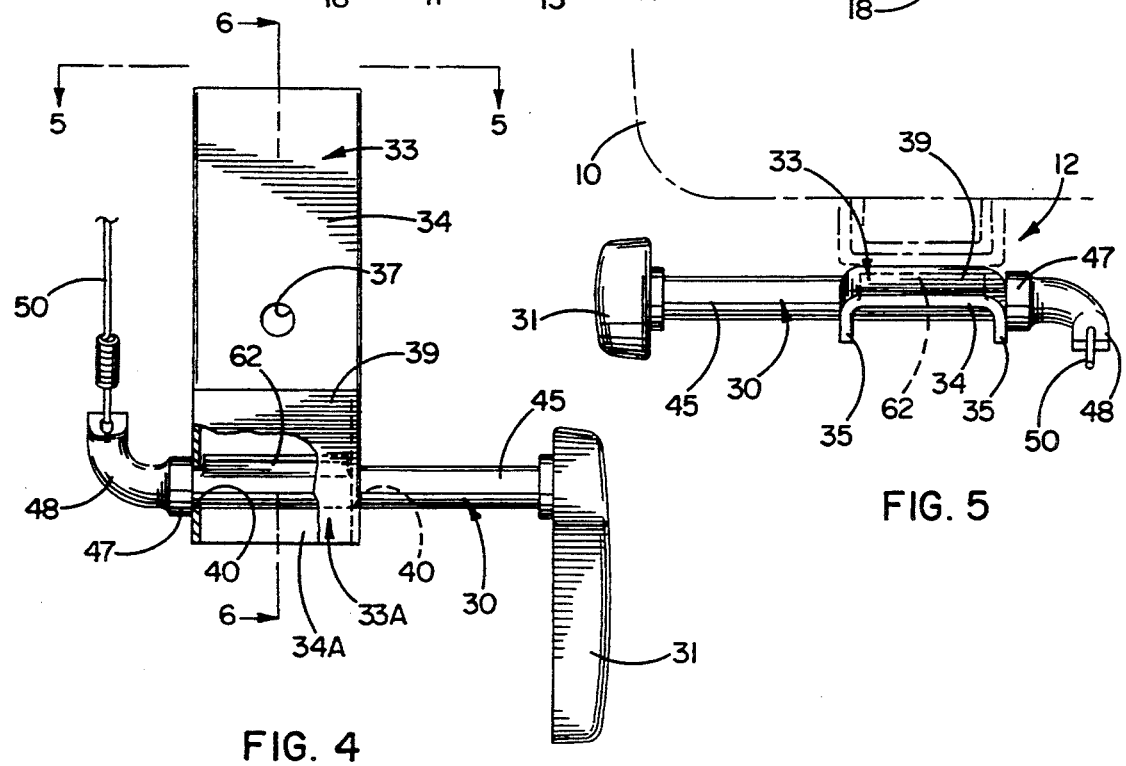
FIG. 4
FIG. 5
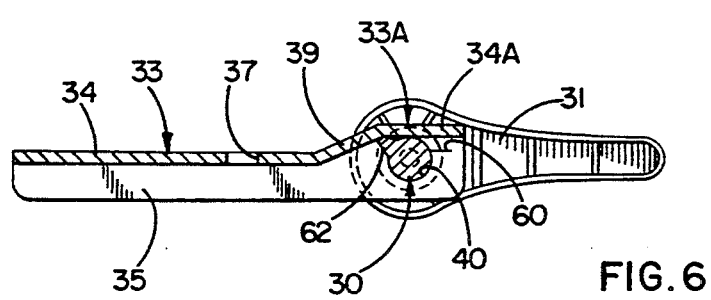
FIG. 6

VEHICLE SEAT ADJUSTER WITH CONVENIENTLY ACCESSIBLE ROTARY ACTUATOR

BACKGROUND OF THE INVENTION

This invention relates to a seat adjuster or track assembly for supporting a vehicle seat for selective back and forth adjustment in the passenger compartment of the vehicle.

Typically, the front seat of the vehicle is supported by two adjustable track assemblies, there being one track assembly beneath the seat along each side thereof. Each assembly comprises an upper track secured to the lower side of the seat and supported on a lower track to move back and forth in the passenger compartment. The lower track is anchored to the floor pan of the vehicle.

In the seat adjuster of the invention, the lower track of each assembly is formed with a series of longitudinally spaced latching windows. A latch is pivotally supported on the upper track and includes at least one latching tooth which normally projects into one of the latching windows to lock the upper track against movement relative to the lower track. When the latch is pivoted about an upright axis to an unlatched position, the latching tooth is retracted out of the window to permit adjustment of the upper track and the seat carried thereby.

In some respects, the seat adjuster of the invention is similar to that disclosed in Dove et al U.S. Pat. No. 5,076,529. In the Dove et al seat adjuster, an operating handle is connected directly to the latch of one of the track assemblies and is connected by a wire or cable to the latch of the other track assembly. The operating handle is located beneath the seat between the two track assemblies and its forward end is located near the front of the seat. By reaching down along the front of the seat, a person may grab and swing the operating handle to release the latches and permit adjustment of the seat. In some vehicles, the operating handle—being beneath the seat and between the track assemblies—is inconveniently located and is not readily accessible to and easily actuated by the occupant of the seat.

Thoma U.S. Pat. No. 2,252,218 discloses a seat adjuster in which the operating handle is more conveniently located along the outboard side of the seat so that the occupant may simply reach down alongside the seat in order to actuate the handle and release a latch for purposes of permitting adjustment of the seat. In the Thoma arrangement, however, the operating handle is connected directly to the latch, and both turn about a laterally extending axis. While the latch is effective to hold the upper track of one of the two track assemblies, the upper track of the other assembly is not directly and positively latched and thus is not capable of resisting impact loads in the event the vehicle is involved in an accident.

SUMMARY OF THE INVENTION

The general aim of the present invention is to provide a new and improved fore-and-aft seat adjuster having a rotary actuating handle conveniently located along the outboard side of the seat and capable of effecting unlatching of latches on both track assemblies of the seat adjuster.

A more detailed object of the invention is to achieve the foregoing by providing a seat adjuster having an operating handle located outboard of the seat and capable, when rotated about a laterally extending axis, of effecting pivoting of two laterally spaced latches about upright axes in order to permit fore-and-aft adjustment of the seat.

A further object of the invention is to provide an operating handle subassembly of the foregoing type which may be retrofitted to existing track assemblies in order to convert such assemblies from under the seat actuation to alongside the seat actuation.

The invention also resides in the relatively simple and inexpensive construction of the operating handle subassembly.

These and other objects and advantages of the invention will become more apparent from the following detailed description when taken in conjunction with the accompanying drawings.

BRIEF DESCRIPTION OF THE DRAWINGS

FIG. 1 is a fragmentary perspective view showing a new and improved seat adjuster incorporating the unique features of, the present invention.

FIG. 2 is an enlarged top plan view of the track assemblies of the seat adjuster shown in FIG. 1.

FIG. 3 is a side elevational view of one of the track assemblies and shows the assembly attached to a typical seat.

FIG. 4 is an enlarged view of certain components shown in FIG. 2.

FIG. 5 is a rear elevational view as seen along the line 5—5 of FIG. 4, the vehicle seat being shown in phantom.

FIG. 6 is a cross-section taken substantially along the line 6—6 of FIG. 4.

While the invention is susceptible of various modifications and alternative constructions, a certain illustrated embodiment hereof has been shown in the drawings and will be described below in detail. It should be understood, however, that there is no intention to limit the invention to the specific form disclosed, but on the contrary, the intention is to cover all modifications, alternative constructions and equivalents falling within the spirit and scope of the invention.

DETAILED DESCRIPTION OF THE PREFERRED EMBODIMENT

For purposes of illustration, the invention has been shown in the drawings as embodied in means for mounting a vehicle seat 10 (FIG. 3) on the floor pan 11 of the vehicle and enabling selective back and forth adjustment of the seat. The mounting means comprise two longitudinally extending track assemblies 12 and 12' (FIG. 1) located beneath and along the two sides of the seat. In this instance, the driver's side seat has been shown and thus the track assembly 12 is an outboard assembly while the track assembly 12' is an inboard assembly. The two assemblies are closely similar but are not identical. Components of the assembly 12' that are similar or generally similar to components of the assembly 12 have been indicated by the same but primed reference numerals.

Each track assembly 12, 12' comprises a longitudinally extending upper track 15, 15' whose rear end portions are anchored to the downwardly facing lower side of the seat 10 by studs 16, 16' or other suitable fastening means. Front studs 16A and 16A' anchor the forward end portions of the upper tracks to the seat.

The upper track is supported to roll back and forth along a longitudinally extending lower track 17, 17' which is fastened to the floor pan 11 by studs 18, 18'. Antifriction friction units (not shown) are interposed between the upper and lower tracks and support the upper track to roll on the lower track.

Latches 20 and 20' are pivotally connected to the upper sides of the upper tracks 15 and 15' by vertically extending rivets 21 and 21'. Each latch preferably includes two horizontally extending latching teeth 22, 22' (FIG. 2) normally projecting into adjacent ones of longitudinally spaced and laterally facing latching windows 23, 23' (FIG. 1) formed in the inboard sides of the lower tracks 17, 17'. A spring 24, 24' is connected between each latch and each upper track and normally urges the latch to a latched position in which the teeth engage webs between the windows in order to lock the upper track against longitudinal movement relative to the upper track. When the latch 20, 20' is pivoted about the rivet 21, 21' to an unlatched position, the teeth are retracted from the windows to permit fore-and-aft adjustment Of the upper track and the seat.

The latch 20 is adapted to be pivoted to its unlatched position by a direct manual operation and, during such pivoting, serves to pivot the latch 20' to its unlatched position. For this purpose, a link 25 is secured rigidly to and projects forwardly from the latch 20 and is connected to the forward end of a wire 26. The other end of the wire is connected to a rear portion of the latch 20'. Accordingly, counterclockwise pivoting (FIG. 2) of the latch 20 toward its unlatched position causes the wire 26 to pivot the latch 20' clockwise to its unlatched position.

As described thus far, the track assemblies 12 and 12' are of conventional and well known construction. In accordance with the present invention, the latch 20 is adapted to be pivoted about the vertical rivet 21 to its unlatched position by manually turning a laterally extending rod 30 having an operating handle 31 located closely adjacent the outboard side of the seat 10. By virtue of the location of the handle, a person in the seat may conveniently reach down along the outboard side of the seat to grab and turn the handle and thereby effect adjustment of the seat. This eliminates the inconvenience of reaching down along the front of the seat to find and actuate a handle or the like located beneath the seat.

More specifically, the rod 30 is supported for turning about a laterally extending axis by a metal channel 33 of generally inverted U-shaped cross-section. The channel is adapted to be attached to the forward end portion of the upper track 15 of the track assembly 12 and includes a top web 34 having a rear portion which is disposed in face-to-face engagement with the top side of the upper track. Inboard and outboard side flanges 35 (FIG. 5) are formed integrally with and depend from the web. The rear portions of the flanges snugly straddle the upper track 15.

The channel 33 may be permanently secured to the upper track 15 by various means such as welding or rivets. Preferably, however, the channel is secured to the track by the same stud 16A which is used to attach the track to the seat 10. For this purpose, a vertically extending hole 37 (FIG. 4) is formed through the rear portion of the web 34 for receiving the stud 16A. When the track 15 is secured to the seat 10, the channel 33 becomes clamped between the track and the seat.

As shown most clearly in FIG. 1, a portion of the channel 33 projects forwardly from the upper track 15. The forwardly projecting portion of the channel includes an upper section 33A whose web 34A is spaced upwardly from the top of the upper track 15. An inclined intermediate web portion 39 joins the web 34A of the upper section 33A of the channel to the rearwardly and downwardly located web 34.

The rod 30 preferably is molded of plastic and extends rotatably through Circular holes 40 (FIG. 6) formed in the side flanges 35 of the upper section 33A of the channel 33. By virtue of the upper channel section 33A, the lower side of the rod is spaced above the top of the lower track 17 and thus the rod may move into overlying relation with the lower track when the seat 10 is adjusted to an extreme rear position.

As shown most clearly in FIG. 5, the rod 30 includes an outboard portion 45 which extends laterally outwardly from the tracks 15 and 17. The handle 31 preferably is molded of plastic and is detachably secured to the end of the outboard portion of the rod by a screw 46 (FIG. 3). The handle lies closely adjacent the outboard side of the seat 10 and may be grabbed and turned by reaching downwardly alongside the seat.

An inboard end portion 47 of the rod 30 extends a short distance inwardly from the tracks 15 and 17 and is formed with an integral crank 48 disposed perpendicular to the rod. A link in the form of a wire 50 extends from the crank 48 to the rear portion of the latch 20. By virtue of the crank 48 and the wire 50, clockwise turning (FIG. 1) of the handle 31 and the laterally extending rod 30 produces counterclockwise pivoting of the latch 20 about the vertically extending rivet 21 to release the latch. And, as explained above, the latch 20 acts through the wire 26 to release the latch 20'. After the seat 10 has, been adjusted and the handle 31 has been released, the springs 24 and 24' act to return the latches 20 and 20' to their latched positions. During such return, the latch 20 acts through the wire 50 to restore the operating handle 31 to its normal position.

From the foregoing, it will be apparent that the present invention brings, to the art a new and improved seat adjuster in which operation of a rotary handle 31 conveniently located at the outboard side of the seat 10 is effective to pivot both latches 20 and 20' about vertical axes for purposes of effecting fore-and-aft adjustment of the seat 10. Thus, both upper tracks 15, 15' may be positively held by the latches for purposes of resisting impact loads and yet, at the same time, the latches may be released without need of reaching downwardly beneath the front of the seat.

The subassembly consisting of the rod 30, the handle 31, the channel 33, the screw 46 and the wire 50 may either be shipped as a unit with the tracks 15 and 17 or may be shipped as a unit separate unit and installed when the tracks are installed. Also, the above-described subassembly may be used in conjunction with a track assembly originally equipped with or originally intended to be equipped with a conventional undermount actuating handle since the subassembly is secured to the track assembly by the same stud used to attach the track assembly to the seat.

The subassembly consisting of the rod 30, the handle 31, the channel 33, the screw 46 and the wire. 50 also is relatively inexpensive to manufacture and assemble. As noted above, the rod and the handle are molded of plastic. The channel may be economically stamped from sheet metal. To simplify assembly of the rod with the channel, aligned slots 60 (FIG. 6) are formed through the side flanges 35 of the channel and open into the holes 40. The rod 30 is molded with a radially projecting ear 62 (FIGS. 4-6) which is sized to slip through the slot in the inboard side flange and whose width is just slightly less than the transverse dimension between opposing faces of the side flanges.

With the handle 31 detached from the rod 30, the end portion 45 of the rod is simply inserted into the hole 40 in the inboard flange 35 of the channel 33 while the ear 62 is aligned with the slot 60' in that flange. The slot in the inboard flange 35 permits the ear to pass into the channel 33 as the end portion 45 of the rod is moved through the hole 40 in the outboard flange 35. Once the ear 62 has been positioned between the flanges, the rod 30 is turned to move the ear out of alignment with the slots 60 in the flange. Thereafter, the ear 62 engages the flanges 35 to prevent the rod 30 from shifting axially. Outboard shifting of the rod also is prevented by virtue of the end portion 47 of the rod 30 being of larger diameter than the hole 40 in the inboard flange 35.

After the rod 30 has been inserted through the channel 33, the handle 31 may be attached to the rod by the screw 46. When the subassembly is assembled with the track assembly 12, the ear 62, which is located in the channel 33A, is biased into engagement with the underside of the inclined web portion 39 by the spring 24 and limits counterclockwise turning (FIG. 1) of the rod 30. Once the installation has been completed, the rod is restrained angularly by the ear 62 and by a stop lug 70 (FIG. 2) on the latch 20 such that the ear is misaligned with the slots 60 when the latch 20 is in its latched position, its unlatched position or any position therebetween. The rod thus remains in assembled relation with the channel.

I claim:

1. A track assembly for supporting the seat of a vehicle on the floor pan thereof, the seat having a downwardly facing lower side and a laterally facing outboard side, said assembly comprising an upper track adapted to be secured to the lower side of the seat, a lower track adapted to be secured to the floor pan, means movably supporting said upper track on said lower track for generally horizontal adjustment of said upper track forwardly and rearwardly of the vehicle, said lower track having a series of longitudinally spaced and laterally facing latching windows, a latch having at least one latching tooth, means securing said latch to said upper track and supporting said latch to pivot about an upright axis between latched and unlatched positions, said latch normally being disposed in said latched position with said latching tooth located in one of said windows to prevent forward and rearward adjustment of said upper track, means for pivoting said latch about said axis to said unlatched position wherein said tooth is retracted from said one window to permit forward and rearward adjustment of said upper track, said pivoting means comprising a rod having first and second end portions, said rod being supported on said upper track to turn about a laterally extending axis and being positioned with said first end portion located inboard of said tracks, a link connected to said first end portion of said rod and operable to pivot said latch about said upright axis and toward said unlatched position in response to turning of said rod in one direction about said laterally extending axis, said second end portion of said rod being located laterally outboard of said tracks, and an operating handle secured to the second end portion of said rod and located closely adjacent the outboard side of said seat whereby a person in said seat may reach downwardly along the outboard side of the seat to turn said handle and thereby turn said rod in said one direction.

2. A track assembly as defined in claim 1 further including a channel of generally inverted U-shaped cross-section having a web and having laterally spaced and depending inboard and outboard side flanges, said channel being secured to said upper track with said web located above said upper track, with said flanges straddling said upper track and with a portion of said channel projecting forwardly from said upper track, said rod being rotatably supported by the flanges of the forwardly projecting portion of said channel.

3. A track assembly as defined in claim 2 in which the forwardly projecting portion of said channel includes an upper section with its web spaced upwardly from said upper track, said rod being rotatably supported by the flanges of the upper section of the forwardly projecting portion of said channel and having a lower side located above said lower track whereby said rod may move into overlying relation with said lower track when said upper track is adjusted rearwardly relative to said lower track.

4. A track assembly as defined in claim 2 further including generally circular holes formed in said flanges and having edges rotatably Supporting said rod, a crank integral with the first end portion of said rod and connected to said link, an ear integral with and projecting radially from said rod between said handle and said crank, said handle being detachably connected to said second end portion of said rod, and a slot formed in said inboard flange and opening into the hole therein to permit said ear to be moved into said channel from said inboard flange when said handle is detached from said rod, said ear being offset angularly from said slot when said latch is in said latched position, said unlatched position or any position therebetween and being engageable with opposing faces of said flanges to restrict lateral shifting of said rod.

* * * * *